United States Patent
Ck et al.

(10) Patent No.: US 12,177,733 B2
(45) Date of Patent: Dec. 24, 2024

(54) LOAD BALANCING FOR ENTERPRISE DEPLOYMENTS

(71) Applicant: Celona, Inc., Cupertino, CA (US)

(72) Inventors: Sushanth Ck, Cupertino, CA (US); Srinivasan Balasubramanian, San Diego, CA (US); Vinay Anneboina, San Jose, CA (US); Mehmet Yavuz, Palo Alto, CA (US)

(73) Assignee: CELONA, INC., Campbell, CA (US)

( * ) Notice: Subject to any disclaimer, the term of this patent is extended or adjusted under 35 U.S.C. 154(b) by 15 days.

(21) Appl. No.: 17/549,603

(22) Filed: Dec. 13, 2021

(65) Prior Publication Data
US 2023/0030173 A1    Feb. 2, 2023

Related U.S. Application Data

(60) Provisional application No. 63/227,152, filed on Jul. 29, 2021, provisional application No. 63/273,809, filed on Oct. 29, 2021.

(51) Int. Cl.
*H04W 36/22*    (2009.01)
*H04W 28/086*   (2023.01)
*H04W 36/00*    (2009.01)

(52) U.S. Cl.
CPC ....... *H04W 36/22* (2013.01); *H04W 28/0861* (2023.05); *H04W 36/0058* (2018.08); *H04W 36/00837* (2018.08)

(58) Field of Classification Search
CPC ............. H04W 36/22; H04W 36/0058; H04W 36/00837; H04W 36/0085; H04W 28/0861
See application file for complete search history.

(56) References Cited

U.S. PATENT DOCUMENTS

2010/0279638 A1 * 11/2010 Lindoff ................ H04B 17/318
                                                   455/226.1
2012/0100859 A1    4/2012 Han et al.
(Continued)

FOREIGN PATENT DOCUMENTS

WO    2020156498    8/2020
WO    2021062729    4/2021

OTHER PUBLICATIONS

Thomas, Shane, International Search Report and Written Opinion received from the USRO dated Sep. 28, 2022 for appln. No. PCT/US2022/034470, 8 pgs.

*Primary Examiner* — Kan Yuen
(74) *Attorney, Agent, or Firm* — Jaquez Land Greenhaus & McFarland LLP; Bruce W. Greenhaus (57) ABSTRACT

A method and apparatus for enhancing load balancing within wireless networks and, in particular, within wireless networks operating within Enterprise Networks is disclosed. The method and apparatus efficiently balance the load that is shouldered by each BS/AP within the wireless network. This is particularly advantageous within wireless networks operating within an Enterprise Network. Improved BS/AP deployments in Enterprise Networks that maintain high system throughput in the EN while optimizing the performance of UEs (with regard to battery utilization and service) are disclosed. Improved EN deployments for UE mobility that reduces measurement scans required of and performed by the UEs are disclosed.

10 Claims, 8 Drawing Sheets

(56) References Cited

U.S. PATENT DOCUMENTS

| | | | |
|---|---|---|---|
| 2013/0344874 A1* | 12/2013 | Kim | H04W 28/0808 |
| | | | 455/438 |
| 2014/0349704 A1* | 11/2014 | Xiao | H04W 28/0861 |
| | | | 455/525 |
| 2015/0011224 A1* | 1/2015 | Kompalli Chakravartula | |
| | | | H04W 36/0085 |
| | | | 455/438 |
| 2015/0304889 A1* | 10/2015 | Qian | H04W 72/569 |
| | | | 370/235 |
| 2016/0036657 A1 | 2/2016 | Ardeli et al. | |
| 2016/0112902 A1 | 4/2016 | Huh et al. | |
| 2016/0277968 A1* | 9/2016 | Ekemark | H04W 28/0861 |
| 2016/0295466 A1* | 10/2016 | da Silva | H04W 28/0861 |
| 2017/0208482 A1* | 7/2017 | Yamazaki | H04W 48/18 |
| 2017/0332302 A1* | 11/2017 | Ercan | H04W 36/0088 |
| 2017/0332303 A1* | 11/2017 | Sunay | H04W 8/22 |
| 2020/0137673 A1 | 4/2020 | Shikari et al. | |
| 2022/0095134 A1* | 3/2022 | Shi | H04W 48/16 |

\* cited by examiner

LOAD BALANCING FOR ENTERPRISE DEPLOYMENTS

CLAIM OF PRIORITY

This utility application claims priority under 35 USC section 111 (b) and under 35 USC section 119 (e), to earlier-filed provisional application No. 63/227,152 filed Jul. 29, 2021, entitled "Load Balancing For Enterprise Deployments"; and to earlier-filed provisional application No. 63/273,809 filed Oct. 29, 2021, entitled "Load Balancing for Enterprise Deployments", and the contents of both of the above-cited earlier-filed provisional applications (App. No.: 63/227,152 and App. No.: 63/273,809) are hereby incorporated by reference herein as if set forth in full.

BACKGROUND

(1) Technical Field

The disclosed method and apparatus relate generally to wireless communications and in particular, and the disclosed method and apparatus relates to methods and apparatus to enhance load balancing within wireless networks and in particular within wireless networks operating within Enterprise Networks (ENs).

(2) Background

It is commonplace today for communications to occur over a wireless network in which user equipment (UE) connects to the network via a wireless transceiver, such an eNodeB, gNodeB, access point or base station, hereafter referred to generically as a BS/AP (base station/Access Point). In this disclosure the term eNodeB is shortened to the term "eNB" and is used generically to refer to the following: a single sector eNB/gNB; a dual sector eNB/gNB, with each sector acting independently; and a node that supports both eNB and gNB functions. The UE may be a wireless cellular telephone, tablet, computer, Internet-of-Things (IoT) device, or other such wireless equipment. The BS/AP may be an eNodeB ("eNB") as defined in 3GPP specifications for long term evolution (LTE) systems (sometimes referred to as $4^{th}$ Generation (4G) systems) or a gNodeB as defined in 3GPP specifications for new radio (NR) systems (sometimes referred to as 5G systems). Furthermore, the BS/AP may be a single sector node or a dual sector node in which each of two sectors act independently. In 4G and 5G systems, there are times when a relatively large number of UEs may be attempting to access the network through the same "cell". In many cases, there is a mix of UEs, some requiring high throughput with data arriving in bursts and other UEs requiring minimal throughput, but having frequent data transmit and receive requirements.

Several challenges arise when dealing with various scenarios in which a UE enters a congested cell (including both issues within a cell from which the UE is leaving as well as issues within the congested cell into which the UE is entering). For example, each BS/AP has a limited resource capacity, hardware, radio, CPU and memory. These constraints dictate the maximum number of UEs that a BS/AP can adequately serve. In some cases, a UE is denied service when it tries to connect to a BS/AP that lacks sufficient resources to adequately accommodate the UE. Furthermore, a UE acquires resources on a BS/AP when it needs service. Such resources are released by the BS/AP when the UE becomes idle. The released resources can then be reassigned to other devices. However, for devices requiring continuous traffic, always connected, or periodic traffic these resources need to be reserved for a relatively long time (for example, every few 10s of milliseconds).

It should be noted that the condition of the radio link associated with the UE's location dictates the BS/AP to which the UE is to attach. In an ideal scenario (and if not otherwise encouraged by a BS/AP), a UE always tries to connect to the cell having the best radio conditions. This is typically the closest cell to the UE. When a large number of UEs cluster around a particular location, they will all try to attach to the same cell (BS/AP). Accordingly, it is likely that the available resources (sometimes referred to as the resource usage threshold) will be breached at a BS/AP. Such resources include, among other things, the number of UEs that the BS/AP can support, the number of Physical Resource Blocks (PRBs) that the BS/AP can support, the available computing resources, such as CPU bandwidth, and the amount of memory available. Each of these resources have an upper limit. The resource usage threshold refers to the upper limit of these resources. When the available resources (or resource usage threshold) of a particular BS/AP is breached, the result may be that some of the UEs in the cluster fail to receive service (i.e., cannot attain services through the network).

Accordingly, it would be advantageous to provide a system that can efficiently balance the load that is shouldered by each BS/AP within a wireless network. This is particularly advantageous within wireless networks operating within an Enterprise Network.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The presently disclosed method and apparatus allows a load balancer (LBr) to communicate with BS/APs deployed in an enterprise network at a campus or particular enterprise site. In some embodiments, the LBr is a centralized-LBr (CLBr). Alternatively, the LBr is distributed with several distributed-LBr (DLBrs) units exchanging information across service, with each DLBr supporting a set of BS/APs. In one embodiment, there can be a DLBr in each BS/AP.

In some such embodiments, the LBr receives information regarding the load of individual BS/APs. The LBr configures a handover (HO) offset for each individual BS/AP based on the congestion levels associated with that BS/AP. The HO offset is a value which determines when a Handover (HO) should be triggered. In some embodiments, a Handover is triggered when:

$$HO\ offset < target\ RSRP - source\ RSRP \qquad EQ.\ 1$$

That is, an HO is triggered if the HO offset is less than the RSRP ("reference signal received power") of signals from a target minus the RSRP of signals received from a source (i.e., the signals received from a potential serving BS/AP (target BS/AP) are stronger than the signals from the BS/AP (source or "serving" BS/AP) currently serving the UE by an amount indicated by the HO offset). The handover offsets are used by the BS/APs (or eNBs) to coordinate handovers of the UEs between their respective cells. In some embodiments, congestion levels are either detected or predicted. In other embodiments, the congestion levels are both detected and predicted. An HO offset assists in coordinating an HO of one or more UEs from a "source BS/AP" (or "serving" BS/AP) to which the UEs are currently attached or in which the UE resides and a "target BS/AP" through which the UE will then attempt to receive service.

Figure 2:
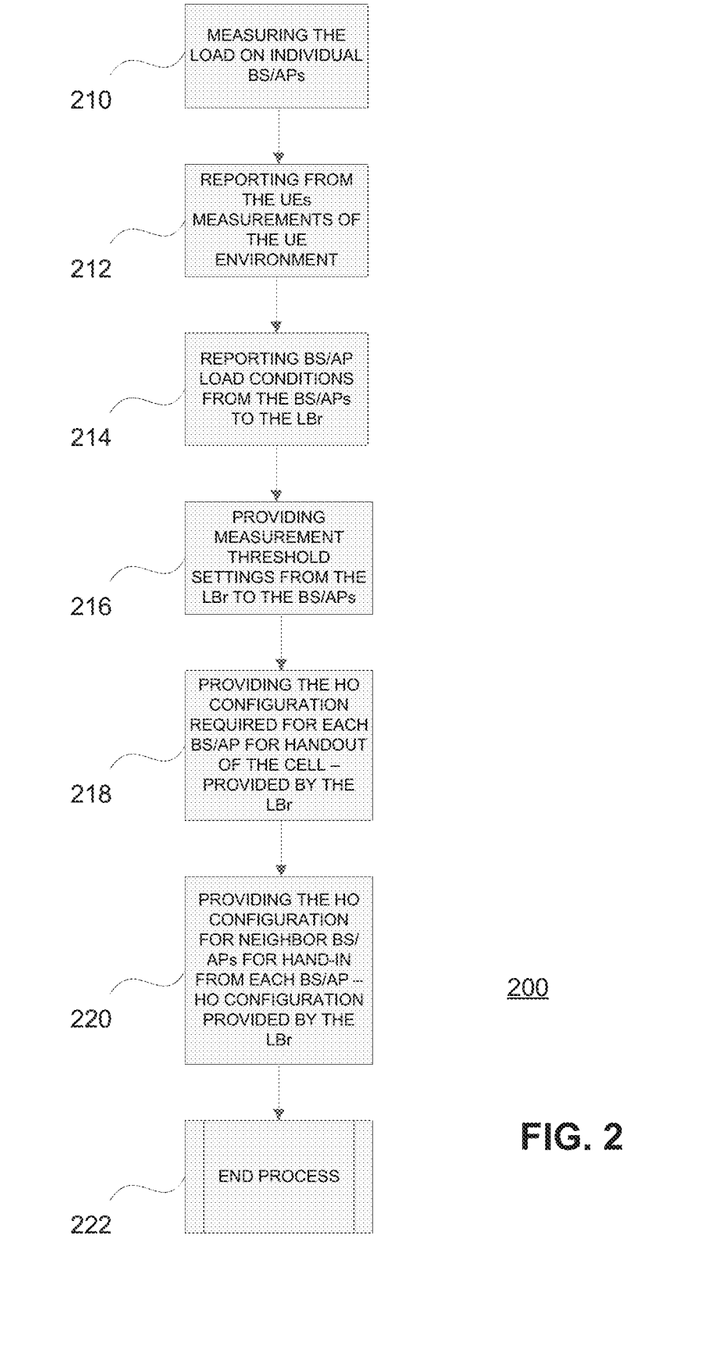
FIG. 2 is a flow diagram showing a method of balancing loads on BS/APs in a wireless communications network.

In some embodiments, the disclosed apparatus performs a method that includes the following stages for "connected" mode UEs. The disclosed method 200 is shown in the flow diagram of FIG. 2 and its stages are referenced hereinbelow:

(1) As shown in FIG. 2, at a stage 210, the method 200 includes measuring the load within each BS/AP (or "eNB"). In some embodiments, this includes either the number of UEs being serviced through the BS/AP and/or the amount of data flowing through the BS/AP from all UEs that the BS/AP is servicing;

(2) At a stage 212, the method 200 includes reporting from the UE, measurements of the UE environment taken by the UE. In some embodiments, the UE environment includes the signal strength of signals received by the UE from various BS/APs in the enterprise network. In some embodiments, when the signals between the UE and the BS/AP currently serving the UE fall below a "search threshold", the BS/AP configures the UE to search inter-frequency neighbors and report on the signals received from those neighbors. In the context of this disclosure, "intra" frequencies are the frequencies (or more accurately, the "channels") that a UE operates when in communication with a serving BS/AP. Said differently, intra-frequencies are frequencies that operate within the same band as the BS/AP serving a selected UE. Inter-frequencies, on the other hand, comprise those frequencies (or "channels") other than the frequency band that the selected UE uses to access the wireless network (that is, inter-frequencies are frequencies (or channels) other than those used by the UE to communicate with the serving BS/AP). In some such embodiments, the search threshold is provided by the network. Alternatively, the UE reporting is done periodically or in response to an event. Search thresholds are defined herein as an RSRP threshold of connected mode UEs at which the BS/AP configures the UEs to search for inter-frequency neighbors. In some embodiments, RSRQ (reference signal received quality) measurement reports are used as the search threshold parameters. The UEs are configured with these search thresholds and instructed to report a measurement event upon reaching the search thresholds. In some embodiments, the search thresholds include but are not limited to the following: LTE measurement report triggering events including, but not limited to, the following: a) the serving BS/AP becomes better than a selected threshold; b) the serving BS/AP becomes worse than a selected threshold; c) a neighbor BS/AP becomes better by a selected offset than a PCell; d) a neighbor BS/AP becomes better than a selected threshold; e) a PCell becomes worse than a first selected threshold1 and a neighbor BS/AP becomes better than a second selected threshold2; f) a neighbor BS/AP becomes a selected offset value better than an SCell; g) a CSI-RS resource becomes better than a third selected threshold; h) a CSI-RS resource becomes better than a reference CSI-RS resource; i) an inter-RAT neighbor becomes better than a fourth selected threshold; j) a PCell becomes worse than a first selected threshold1 and the inter-RAT neighbor becomes better than a second selected threshold2; k) a WLAN becomes better than a selected threshold; l) all WLAN inside a WLAN mobility set becomes worse than the threshold1 and a WLAN outside the WLAN mobility set becomes better than the threshold2; m) all WLAN inside the WLAN mobility set becomes worse than a selected threshold; n) a channel busy ratio exceeds a selected threshold value; and o) the channel busy ratio falls below a selected threshold value. Upon receiving the event, the BS/AP configures the UE with measurement objects required to search the neighboring cells;

(3) At a stage 214, the method 200 includes reporting BS/AP load conditions from the BS/AP to the LBr. In some embodiments, BS/AP load reporting is performed either on a Continuous basis or upon crossing of a search threshold. In other embodiments, the load reporting is done both on a continuous (e.g., periodic) basis and also between reporting periods in response to the occurrence of a triggering event;

(4) At a stage 216, the method 200 includes providing the measurement threshold settings from the LBr to the individual BS/APs. The BS/APs in turn provide the search and measurement thresholds to the UEs. In some embodiments, adjustments to the measurement threshold settings are continuously provided from the LBr to the BS/APs. If the method uses event-based measurements (as opposed to using periodic measurements)

then the measurement thresholds can be defined as RSRP measurement thresholds for neighbor and source BS/APs that trigger a Handover (HO) event;

(5) At a stage 218, the method 200 includes providing the HO configuration used by each BS/AP for hand-out of the cell (i.e., releasing a UE from the BS/AP). In some embodiments, the HO configuration is provided by the LBr. In some embodiments, the HO configuration comprises the RSRP relative offset between the serving cell and an intended neighbor cell. In some embodiments the HO configuration comprises a combination of RSRP offsets and RSRQ offsets. If there is location fingerprinting available, the HO configuration may comprise the neighbor cell's RSRPs required for triangulation. Angle of arrival plus a Time of Arrival methods could be used to determine a UE's location, and this information could be used, in some embodiments, to select an appropriate neighbor cell for the HO. If the UE's generated load is available, then the UE's location information can be used together with the UE's loading information to select the UE to perform the HO. Selecting the UE with a highest load contribution to perform the HO is the fastest method to achieve the desired load balancing result; and (6) At a stage 220, the method 200 includes providing the HO configuration for neighbor BS/APs for hand-in from each BS/AP (accepting a UE into service by the BS/AP). In some embodiments, the HO configuration for the neighbor BS/APs is provided by the LBr.

(7) The method 200 ends at a stage 222.

For idle mode UEs, the measurements that are used are established by the "qRxlevMin" value settings (entry thresholds for the UEs) that need to be managed to restrict UEs from entering a cell when the cell is overloaded.

BS/AP Load Measurement and Reporting

In some embodiments, the load of at least one of the serving cells is reported by a BS/AP to the LBr. In some embodiments, a proprietary messaging scheme is used to report the load information. In accordance with one such messaging scheme, a message name protocol is used, and the parameters provided in the message are sent by the BS/AP to the LBr. In some embodiments, the load information consists of one or more of: (1) a current value, (2) a time-series of these values, and (3) predicted values based upon recognized patterns. The particular values are based on: (1) recognized patterns, (2) the number of UE's in the cell, (3) Physical Resource Block (PRB) usage, (4) the average Reference Signal Receive Power (RSRP) of the UEs in the cell, (5) the buffer occupancy (BO), (6) the number of dedicated bearers across the UE in the cell, and (7) the types of traffic flows associated with the cell.

Along with load information, the BS/AP can communicate the distribution of UEs' physical locations in the current cell and an estimate of their average location relative to the serving cell.

UE Measurements

In accordance with some embodiments, each UE is configured to measure both intra-frequency and inter-frequency neighbor cells. It is desirable to avoid measuring intra-frequency neighbor cells because of interference of the cell edge UEs when they are handed over to a neighbor cell. Intra-frequency neighbor cells are relevant when there is overlap between the intra and inter-frequency neighbor cells. Intra-frequency neighbor cells can also be helpful and relevant when it is desirable to change the power level of the neighbor cells to offload to a neighbor cell. This is sometimes referred to as "cell-breathing".

Figure 1:
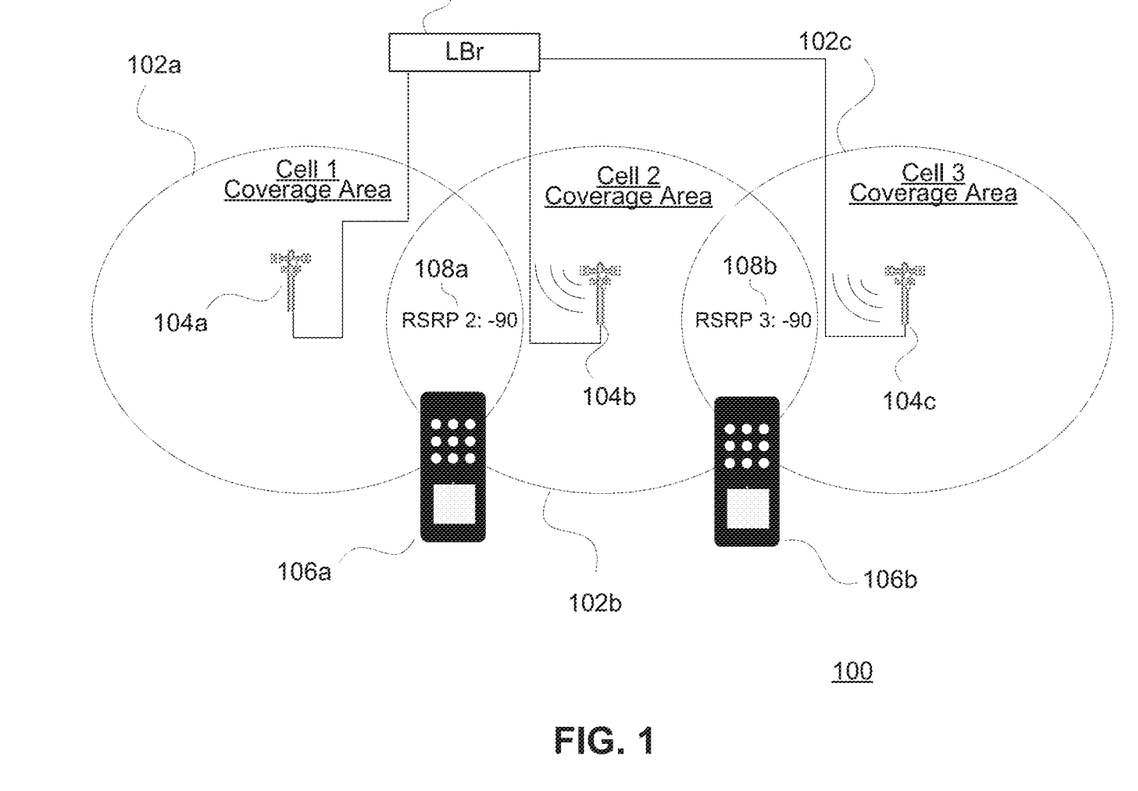
FIG. 1 is an illustration of three cell coverage areas within an Enterprise Network (EN), having BS/APs at the center of each cell coverage area and two UEs operating within the EN.

FIG. 1 is an illustration of three cell coverage areas 102a, 102b, 102c within an enterprise network 100, BS/APs 104a, 104b, 104c at the center of each cell coverage area 102 and two UEs 106 within the network 100. It should be noted that throughout this disclosure, reference numbers having alphabetic characters (such as 102a and 102b) refer to similar elements in the figure and may be referenced collectively by the numeric portion of the reference number (such as 102). In one embodiment, the first UE 106a is being served by a first cell (the "serving" cell serviced by the serving BS/AP 104a) having the coverage 102a. The first UE 106a, provides a measurement report that includes information about the second cell having the coverage area 102b, such as the RSRP 108a of signals received from the BS/AP 104b in the second cell (the BS/AP 104b services the second cell and is referred to as a "neighbor" cell having coverage area 102b). Similarly, the second UE 106b is being served by a cell (and an associated and corresponding BS/AP 104b) having the coverage area 102b. The second UE 106b provides a measurement report 108b that includes information regarding a third cell having the coverage area 102c. Each of the BS/APs 104 is connected to an LBr 110. The connection can be either a wired backhaul connection, or a wireless connection, such as a satellite link or line of sight microwave link. In some embodiments, the LBr 110 uses the information provided by the UEs 106 in the measurement reports to identify a potential target cell (i.e., the cell to which a cell (and corresponding BS/AP 104) can offload some of its load).

In some embodiments, the BS/AP load reporting to the LBr 110 is done periodically. The periodicity of the report is configurable. In some embodiments, the periodicity can be adjusted based on the mean of the slope of the load change. If the load is expected to change abruptly over time, the measurement periodicity can be increased. Accordingly, in some embodiments, the period is based on the mean slope of the load (i.e., the rate of change in the loading of the cell). In some embodiments, in addition to performing load measurements, the BS/AP can communicate the distribution of UEs in the current cell and an estimate of their average location relative to the serving cell.

UE Periodic Measurements

In some embodiments, UEs are configured to send periodic measurements. In some embodiments, the UE measurements provided by the plurality of UEs are provided in UE measurement reports. The periodicity is configurable and based on: (1) the cell load; and (2) the mean slope of the load change. Similar to the load reporting from the BS/APs 104 to the LBr 110, if the load is expected to change abruptly over time, the measurement periodicity of the UE measurement reporting can be increased. Accordingly, in some embodiments, the period is based on the mean slope of the load (i.e., the rate of change in the loading of the cell). In some embodiments, periodic measurements are used when the UE's battery consumption is not an issue. In addition, periodic measurements provide a means to quickly take action for load balancing across the cells. Such periodic measurements will increase the system load, due to signaling overhead involved with such reporting from the UEs 106. Therefore, a trade-off exists between providing periodic measurements that maintain a current status of the system and the additional load that is imposed on the system involved. Periodic measurements may be enabled/disabled based on the individual UE operating conditions including detected mobility, BS/AP loading levels, and network wide loading conditions.

UE Event Triggered Measurements

In some embodiments, thresholds are provided for one or more of the UEs 106. These thresholds are used to determine when to report both intra and/or inter-frequency neighbor information. In some embodiments, only intra-frequency measurements are reported. As set forth above, in the context of this disclosure, "intra" frequencies are the frequencies (or more accurately, the "channels") that a UE operates when in communication with a serving BS/AP. Said differently, intra-frequencies are frequencies that operate within the same band as the BS/AP serving a selected UE. Inter-frequencies, on the other hand, comprise those frequencies (or "channels") other than the frequency band that the selected UE uses to access the wireless network (that is, inter-frequencies are frequencies (or channels) other than those used by the UE to communicate with the serving BS/AP). The term "channel" indicates a frequency range. There are several channels within a band of operation.

When relevant thresholds are crossed, the UE 106 is requested by the BS/AP 104 to perform inter-frequency measurements. In some embodiments, event triggers are used when the UE's battery consumption is a concern (as opposed to using periodic measurements). In some embodiments, monitoring the level of the battery within the UE 106 may be a factor in determining whether to use periodic or event driven triggering of measurements. In such embodiments, when the battery level drops below a threshold, the UE 106 ceases operating on a periodic trigger basis and starts operating only upon the occurrence of an event trigger. In some embodiments, the UE only performs intra-frequency (otherwise referred to as "horizontal") measurements unless inter-frequency (otherwise known as "vertical") measurements are needed. Such a deployment configuration allows for such measurement types to be used and provides extended battery performance in the UE.

Figure 3:
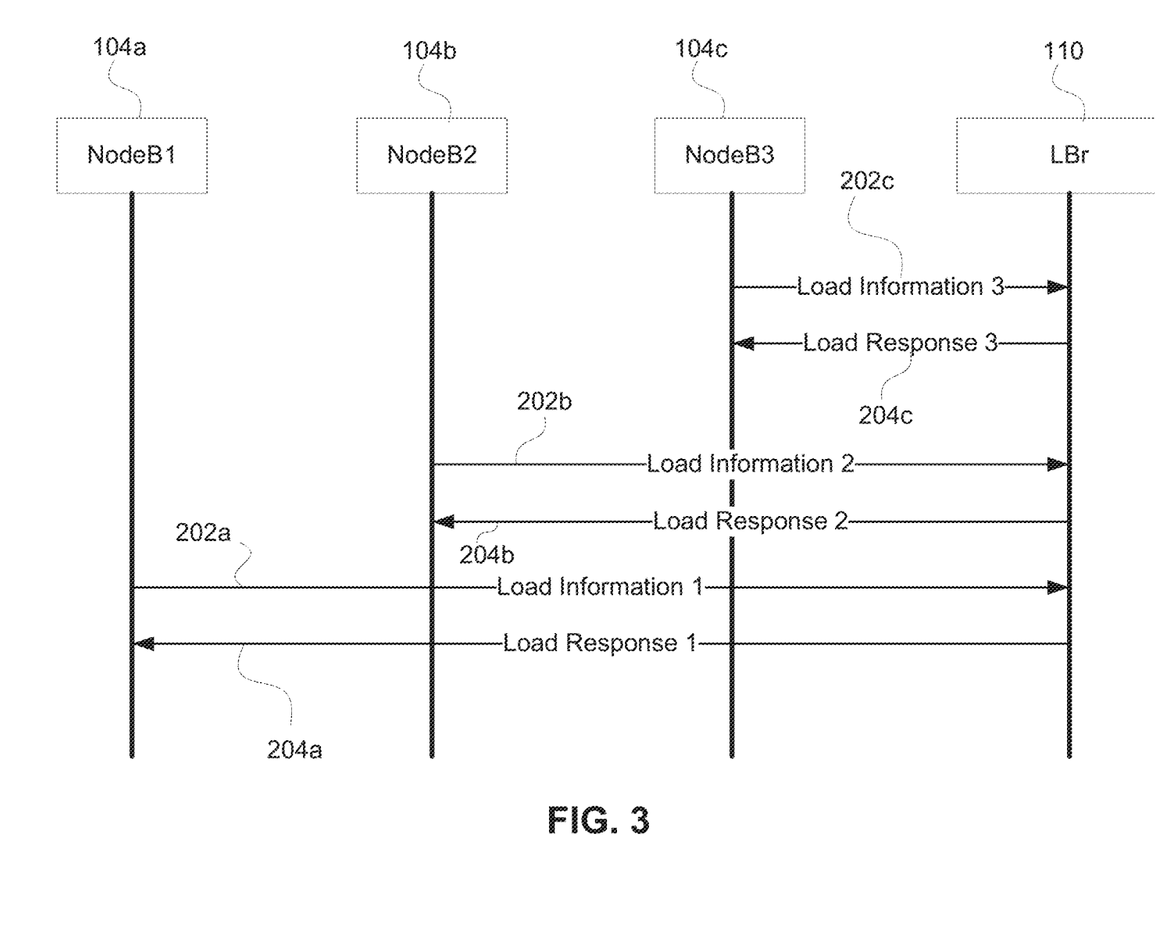
FIG. 3 is a diagram showing a flow diagram of communications that occur between the Load Balancer (LBr) and the BS/APs shown in FIG. 1.

FIG. 3 is a diagram showing a flow diagram of communications that occur between the LBr 110 and the BS/APs 104. Each BS/AP 104 provides load information 202 to the LBr 110. In turn, the LBr 110 uses the load information 202 to generate a load response 204 when appropriate.

On receiving load information 202, the LBr 110 checks whether the load of the cell has exceeded a predetermined threshold. If the load has exceeded a predetermined threshold, then the LBr 110 looks for a candidate target neighbor cell to which to transfer the source cell's (or "serving" cell's) load. In some embodiments, the candidate target neighbor cell is evaluated based on: (1) the load of each neighbor cell; and (2) the number of UE's 106 being serviced by each neighbor cell. In some embodiments, the neighbor cell that is nearest and that has the least load is preferred as the target neighbor cell. Once one or more candidate target cells are determined, the LBr 110 establishes an HO offset between the serving cell and each candidate target cell. In some embodiments, the HO offset is a value that is used as a threshold difference between the RSRP of signals received from the source cell and the RSRP of signals received from the candidate target cell to determine whether to perform the HO. The HO is established such that UE's 106 that are handed over from a source cell are easily handed over to the candidate target cell and the UE's 106 from the target cell do not get handed back to the source cell. This is ensured by raising the HO exit threshold from the source cell and lowering the entry threshold into the target cell. The reentry threshold to the source cell is also set high so that the UE does not return back to the source cell. In some embodiments, transfer of the load from the source cell to the target cell results in UEs 106 not performing an initial attachment, or entering "idle to connected entry" on the source cell, or transitioning back to the source cell, as these activities add to the load on the source cell.

Upon receiving a handover configuration from the LBr 110, the source cell applies the established handover offset for the target cell. That is, if the reported offset (target neighbor cell RSRP−source cell RSRP) is better than the established handover offset, the UE 106 is handed over to the target cell. HO procedures are initiated by the UE reporting measurement information. The measurement information is reported from the UE based on the UE sensing threshold changes. The different types of measurement report triggering events are described above. The behavior of UE offload to another cell is accomplished by manipulating the thresholds used by the UE in the UE reporting measurement information.

If the HO offset is very large, it indicates a relatively high load exists at the target neighbor cell. In some embodiments, the source cell can temporarily remove such neighbors from the neighbor list. Also, the HO offset for those neighbors can be increased or their frequency priority decreased so that idle mode mobility is reduced to the loaded neighbor. The frequency priorities for a UE to transition from one cell to another cell are determined when multiple neighbor cells having different operating frequencies are present. For idle mode mobility, the UE does not send any measurement information to the network and performs autonomous mobility across the cell. The intent of modifying the thresholds is to regulate the UE mobility while in idle mode. This is very different from connected mode UE operations.

In some embodiments, cell selection parameters for the serving cell can be modified to reduce the effective serving area of the cell based on the cell load. Also, in some embodiments, a preferred candidate neighbor, as indicated by the load indication response received from the LBr 110, can be used to perform a UE service redirect using an RRC release, if the cell capacity of the source cell is exceeded.

Figure 4:
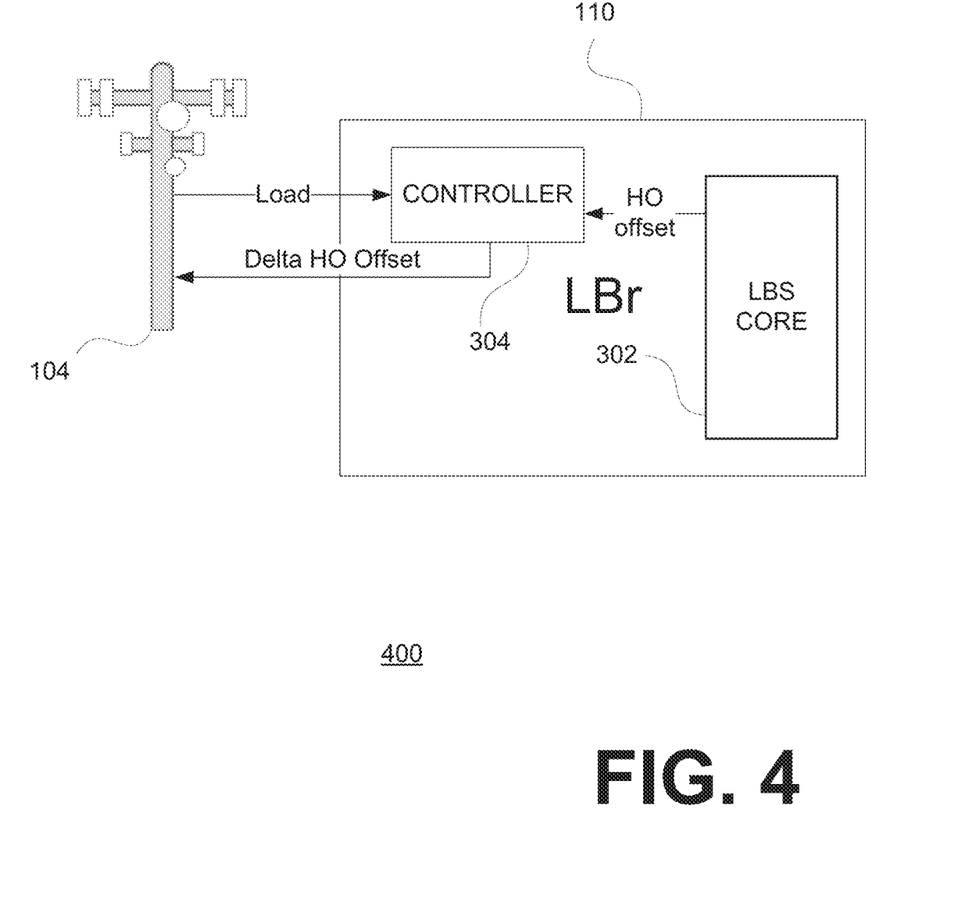
FIG. 4 is a schematic of an embodiment of an LBr in which a closed-loop function is performed.

FIG. 4 is a schematic of an embodiment 400 of an LBr 110 in which a closed-loop function is performed. The closed-loop function includes an LBr core 302 setting an HO offset based on empirical data. It is possible that in some environments the load balancing algorithm may not converge to stabilize the UEs transition across the cells and will result in "ping-pongs" inducing repeated cell transitions. It is possible that the offset is aggressive, and the preferred neighbor can be loaded. This therefore would be one reason that the HO transitions for the UEs would not converge. It should be noted that in some embodiments, a first UE1 may be transitioned from a first cell1 to a second cell2, and at the same time a second UE2 may be transitioned from the second cell2 to the first cell1 practically achieving no benefits with regard to cell load balancing. This process could continue indefinitely.

The PRB utilization of the neighbor can increase given an increase in the number of cell edge UE's. To avoid such pitfalls, a closed-control loop is used to evaluate the effect of actions that might be taken on the load of both the source cell and the target cell. A controller 304 causes HO offsets to slowly increase over a period by a delta value, rather than having an absolute instantaneous HO offset being established. This avoids the system becoming unstable and achieves a faster convergence to a desired steady state.

Furthermore, in some embodiments, a periodic intra-frequency measurement is started instead of starting on inter-frequency. In some embodiments, when a cell is loaded, the LBr 110 chooses the UE's 106 that have relatively lower serving cell RSRP.

In some embodiments, inter-frequency event-based measurements are configured on the set of UE's with an HO offset derived from the HO offset provided by the LBr, rather than using the values provided by the LBr as is. This allows for a given BS/AP to support a bias function that further regulates UE connectivity to that BS/AP.

In some embodiments, a load balancing group is defined as the set of neighboring cells with relatively large cell overlap. When configuring a UE to search for neighbor target cells, the LBr 110 can restrict the reporting HO offset only to these neighbors. This will reduce the number of neighbors to scan.

Improved Scan Procedures for UE Mobility in Enterprise Network Deployments

In typical macro networks, BS/APs have RF footprints covering only about thirty-three percent of the cell they serve, with the remaining sixty-seven percent of their coverage overlapping neighboring cells. UEs support features that cancel pilot and other signals that are received from BS/APs in neighboring cells to allow the UE to properly operate within the serving cells. For example, UEs support features such as CRS-IC and joint demod to account for inter-cell interference and provide interference cancellation. In this manner the UEs cancel pilots from non-serving BS/AP neighboring cells to allow proper operation within the serving cell. On channel re-use, deployment of neighboring cells operating on the same frequency is a common place approach for a macro network. However, this is not true for private or enterprise networks.

In stark contrast to macro networks, enterprise networks deploy BS/APs in very close proximity to each other. The cells have very small coverage areas or "footprints". Neighboring cells are typically deployed using independent operating frequencies to avoid outer-cell interference and cross-link interference from occurring. Enterprise networks are deployed in such a manner that allows for high system capacity relative to the co-channel deployment. Essentially, co-channels tend to have high interference issues and cancellation issues which are not typically easily managed in small cell footprints. They tend to use independent frequencies. These factors have implications for the UEs both in idle mode and connected mode operation. It is a challenge to attempt to manage UE mobility and inter-frequency scans in such environments.

It can be problematic when UEs transition from a first operating frequency to another operating frequency ("hopping" from one frequency to another), and when UEs perform inter-frequency scans. When a UE is in idle mode, every time a UE "wakes up" in idle mode, it not only needs to monitor pilot signals operating in the "horizontal" frequency (same frequency as the UE is currently operating under), the UE also has to monitor pilot signals operating in the "vertical" frequencies (different frequencies from the frequency that the UE is currently operating on). A UE wakes up every 1.28 seconds. During each of the wake-up events, in addition to monitoring pages from the cell that the UE is camped on, it also needs to measure cells across multiple frequencies. Aggressive scans and transitions across multiple frequencies may be required in order to address continuity of service availability.

When a UE operates in connected mode, similar techniques are utilized to scan for inter-frequency neighbors. The UE needs to provide measurement gaps for a single receive (Rx) UE. The UE performs scans opportunistically for a single Rx UE. The more often a UE must scan for inter-frequency neighbors, the less the UE is available to the serving BS/AP that is currently serving the UE. Therefore, there is a need to permit a UE to operate on the serving BS/AP frequency as long as possible before performing a Handover to a neighbor cell. It is beneficial to design handover procedures and techniques in such a way that the UE does not need to "leave" its serving channel more often than it absolutely needs to in order to perform measurements related to potential candidate neighbor cells. In addition, and importantly, UE battery power is drained by repeated and frequent scans of potential candidate neighbor cells. This also causes interruptions in service to the UE.

In accordance with the currently disclosed improved handover techniques, UEs perform measurements of potential candidate neighbor cells only when it is absolutely necessary to perform handovers to neighboring cells. Accordingly, UEs perform inter-frequency scans only when they absolutely need to, thereby allowing them to remain on the serving channel as long as possible.

When neighboring cells operating on the same frequency as the serving cell is not supported, the UE is required to scan inter-frequency cells on a relatively frequent basis. This unnecessarily drains UE battery power. Furthermore, UEs performing inter-frequency handovers incur increased failures as compared those performing intra-frequency handovers.

Therefore, a need exists for a method and apparatus for UE mobility operating within enterprise networks that have optimized scanning procedures. The optimized scanning procedures reduce the unavailability of a UE caused by unnecessarily frequent candidate cell measurement procedures while also increasing the performance of the UE including prolonging the battery life of the UE.

Figure 5:
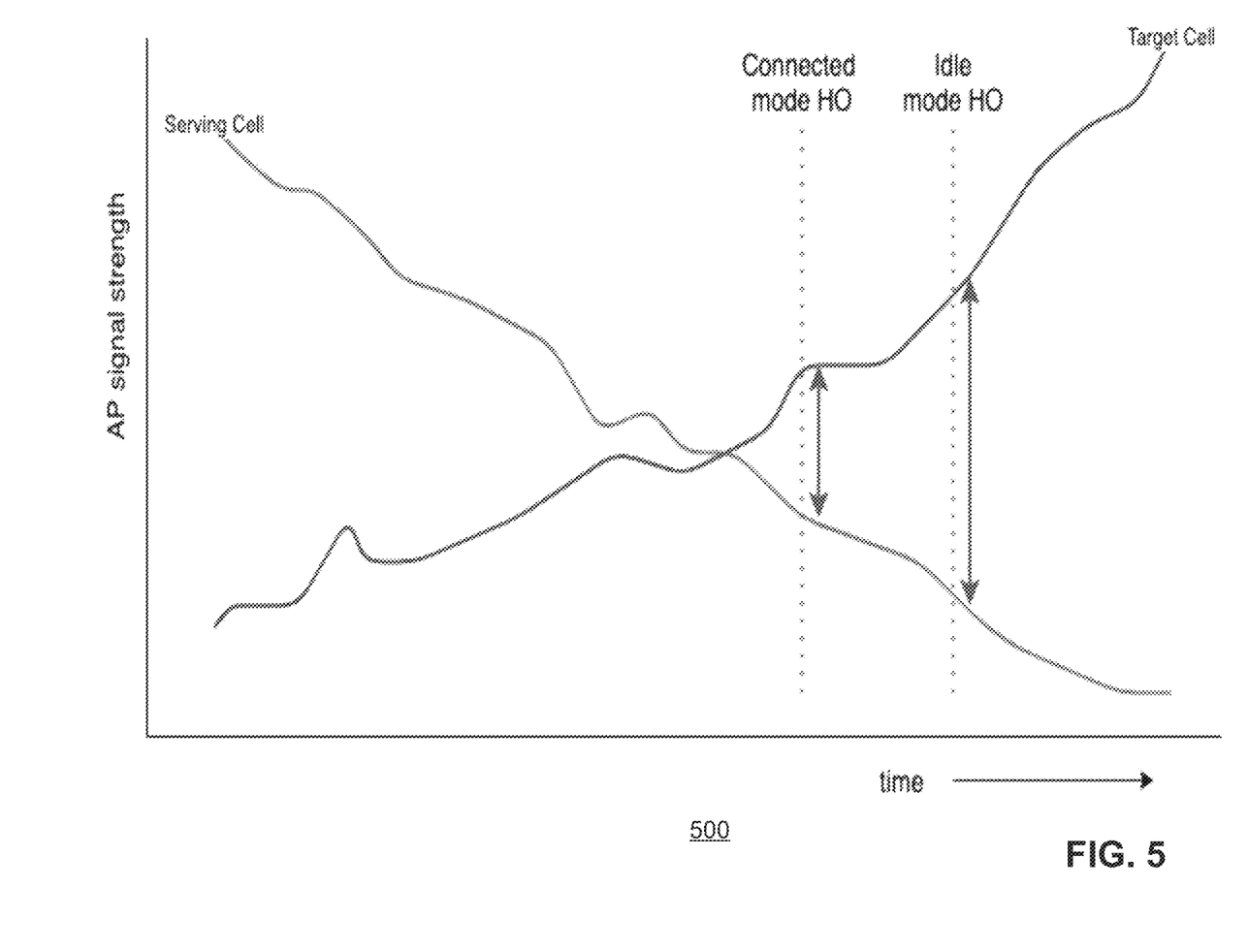
FIG. 5 is an idealistic diagram showing BS/AP signal strengths received by a selected UE from a serving cell and a target cell as the UE moves through an enterprise network over time.

FIG. 5 is an idealistic diagram 500 showing BS/AP signal strengths received by a selected UE from a serving cell and a target cell as the UE moves through an enterprise network over time. As shown in FIG. 5, as the UE moves through the enterprise network over time (moving from left to right in the diagram 500), the signal strength received from the serving BS/AP decreases as the signal strength from a candidate or "target" BS/AP in a target cell increases. This is true when the UE operates in both the idle and connected modes of operation. As shown in FIG. 5, connected mode handovers (HO) should occur sooner in time than idle mode handovers. Connected mode handovers need to be more aggressive than idle mode handovers to avoid crosslink interference caused by connected mode UEs staying on the serving BS/APs connection too long and thereby causing interference to the target BS/AP. Consequently, the connected mode thresholds for HOs must occur sooner in time than the idle mode thresholds. The later a connected mode UE transitions to a target cell (the further to the right that a UE operates on its serving cell in diagram 500), the more interference it causes to the target cell before finally being handed over to the target cell.

Figure 6:
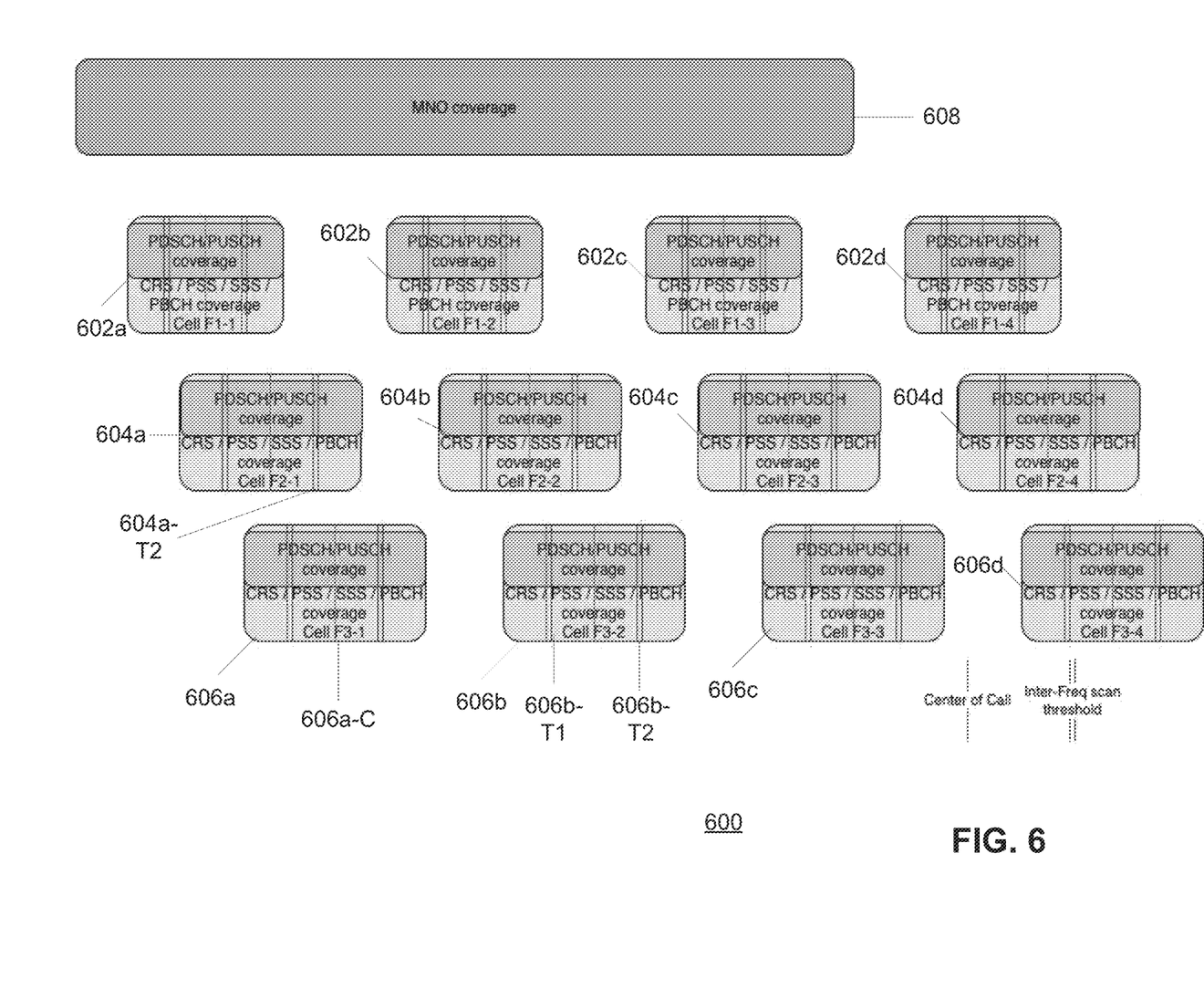
FIG. 6 is a block diagram showing deployment of enterprise network BS/APs based on frequency reuse techniques wherein three frequencies are reused in the network.

FIG. 6 is a block diagram showing typical deployment 600 of enterprise network BS/APs based on frequency reuse techniques wherein three frequencies are reused in the network. As shown in the typical enterprise network deployment 600, the enterprise network comprises same frequency (or "horizontal") cells 602a, 602b, 602c, and 602d, each having associated and corresponding BS/APs that all operate on the same frequency, in this case frequency F1. Similarly, the enterprise network comprises same frequency ("horizontal") cells 604a, 604b, 604c, and 604d, each having associated and corresponding BS/APs that all operate on the same frequency, in this case frequency F2. Similarly, the enterprise network comprises same frequency ("horizontal") cells 606a, 606b, 606c, and 606d, each having associated and corresponding BS/APs that all operate on the same frequency, in this case frequency F3. Cells 602a-602d are considered to be vertical cells to 604a-604d as they operate on different frequencies (F1 for 602a-602d, and F2 for 604a-604d). Similarly, Cells 604a-604d are considered to be vertical cells to 606a-606d as they operate on different frequencies (F2 for 604a-604d, and F3 for 606a-606d). As shown in the deployment 600 of FIG. 6, cellular coverage is also provided to UEs by Mobile Network Operator (s) (MNOs) 608 for UEs having authorization and capability to access the MNOs.

Assume that a selected UE is camped anywhere on a serving cell 602a having an operating frequency of F1. The center of each cell is indicated by a single vertical line running from the top to the bottom of the cell, such as vertical line "606a-C" indicating the center of the cell 606a. Locations within each cell whereat a UE should perform inter-frequency scanning (inter-frequency scan thresholds) are indicated by a pair of double vertical lines within each cell such as the double vertical lines 606b-T1 and 606b-T2 of the cell 606b. As the UE travels from left to right within the serving cell 604a, for example, it will eventually reach an inter-frequency scan threshold requiring the UE to perform a scan for inter-frequency (vertical) neighboring cells.

Note that, due to the spacing between cell coverages as shown in the deployment 600 of FIG. 6, when the UE reaches a location whereat an inter-frequency scan should be performed it will disadvantageously not transition to the center of its closest vertical neighbor cell in the deployment 600 of FIG. 6. For example, as a UE moves from left to right in the cell 604a, it will eventually perform an inter-frequency scan when it reaches the double vertical line 604a-T2. When the UE transitions from the serving cell 604a to its inter-frequency neighbor cell 606a, it will not "land" at the center (indicated by the single vertical line 606a-C) of the cell 606a.

As shown in the deployment 600 of FIG. 6, there are breaks or "holes" in cell coverage between horizontal cells (such as, for example, the breaks or holes between cells 602a and 602b, and between 602b and 602c, and between 602c and 602d). SIB parameters ("system information blocks") are transmitted in broadcast messages (idle mode handover parameters provided to the UE as broadcast messages) and inform the UE when to begin looking for neighbor cells to initiate a handover. In order to avoid interruptions in operation of the UE, the UE must perform scans for an inter-frequency (or vertical) neighbor cell when it reaches an inter-frequency threshold within the servicing cell (such as the serving cell 602a in this example). There is no sense in performing intra-frequency scans because the intra-frequency cells are too far away from the serving cell 602a. Alternatively, in this example, and assuming the UE has the ability to do so, when it leaves cell 602a, the UE can obtain coverage from the MNO until it reaches the cell 602b. This would require a brief break in coverage on the currently camped frequency. The UE will return to the MNO based on the most recently used (MRU) list of frequencies maintained within the UE. When the UE is sufficiently proximate either a vertical or horizontal cell, it can then return to the enterprise network and begin operation with the new serving cell (e.g., the cell 602b, 602c, 604a, etc., depending upon its location). Disadvantageously, the UE may be without coverage and out of operation for some period of time while it transitions between the enterprise network cells and the MNO coverage.

If the UE is an enterprise network-only operating device, and has no access to the MNO, it will perform inter-frequency scans for vertical neighbor cells when it reaches the inter-frequency scan thresholds within the serving cell. For example, the UE will scan for frequency F2 in the vertical neighboring cell 604b when it reaches the inter-frequency scan threshold in the cell 602a and eventually handover to the cell 604b, wherein cell 604b then becomes the serving cell for the UE.

Therefore, there is a need for improved BS/AP deployments in Enterprise Networks that maintain high system throughput in the EN while optimizing the performance of UEs (with regard to battery utilization and service). This need can be met using improved EN deployments for UE mobility that reduces the measurement scans required of and performed by the UEs. Two such improved EN deployments are now described.

Improved Enterprise Network Deployments for UE Mobility

Figure 7:
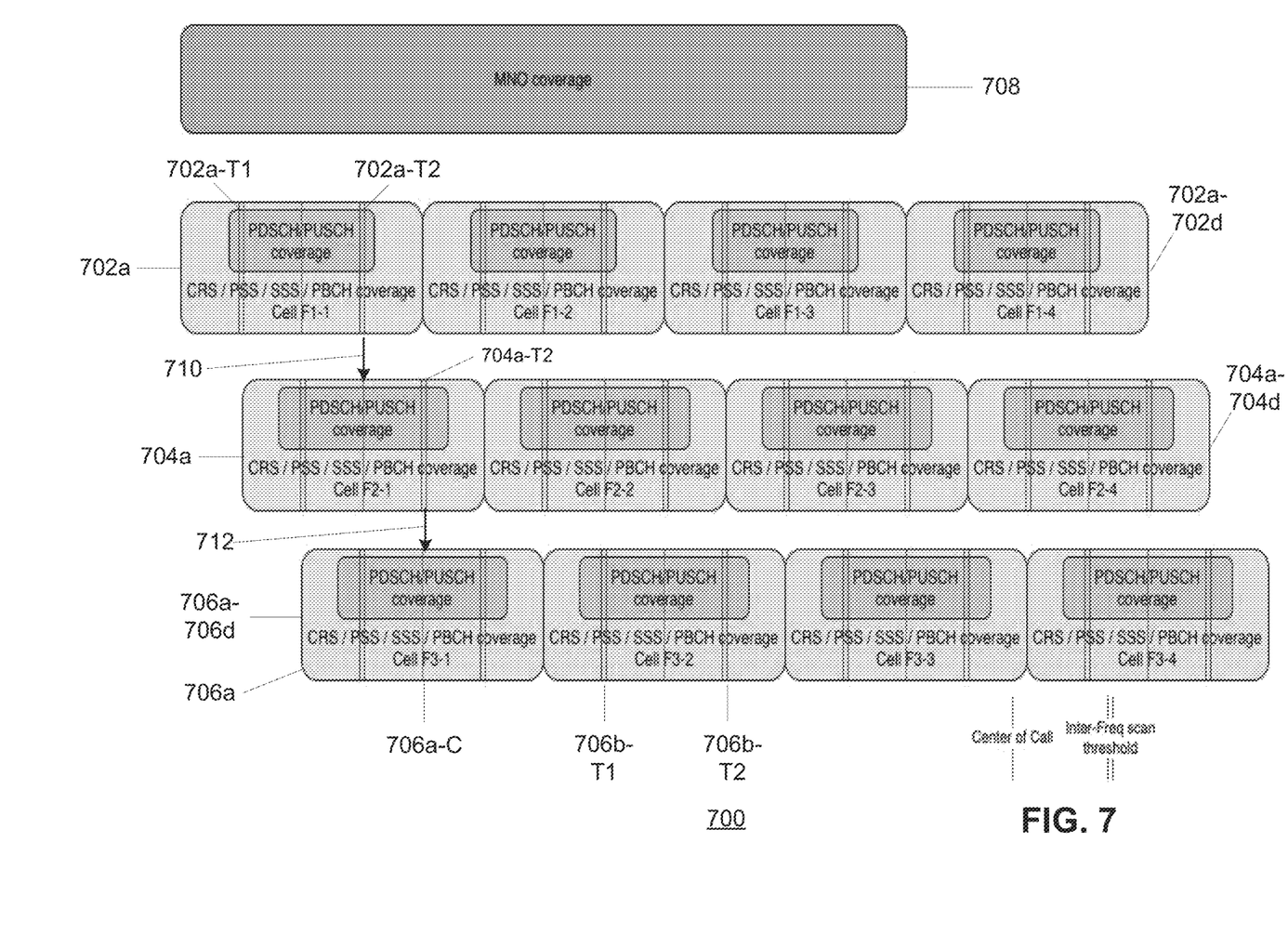
FIG. 7 is a block diagram showing an improved deployment of enterprise network BS/APs based on frequency reuse techniques wherein three frequencies are reused in the network in accordance with the present disclosure.

FIG. 7 is a block diagram showing an improved deployment 700 of enterprise network BS/APs based on frequency reuse techniques wherein three frequencies are reused in the network in accordance with the present disclosure. The intra-frequency (horizontal) cell coverages (such as the coverage provided by the cells 702a-702d) are abutted, or overlapped, as much as possible for a given operating frequency (such as operating frequency F1). The power levels for the CRS/PSS/SSS pilot signals and the PBCH broadcast channels are established in each cell (such as in the cells 702a-702d) such that the coverage provided by these signals abuts, or overlaps, horizontal neighbor cells (for example, the cell 702a abuts or overlaps the cell 702b, the cell 702b abuts or overlaps the cell 702c, etc.). The footprint provided by these broadcast channels are the only ones that are expanded in the improved deployment 700 of FIG. 7. In contrast, the cell coverage provided by the PDSCH and PUSCH data channels remains the same in the deployment 700 as it is in the deployment 600 of FIG. 6. Only the CRS/PSS/SSS and PBCH broadcast channels and their related footprints are increased in accordance with the deployment 700 shown in FIG. 7.

As in the deployment 600 of FIG. 6, the center of each cell (e.g., the cells 702a-702d) is indicated by a single vertical line running from the top to the bottom of the cell, similar to the vertical line "606a-C" shown in the cell 606a of FIG. 6. For example, the center of the cell 706a is indicated by the single vertical line 706a-C shown in the cell 706a. Locations within each cell where a UE should perform inter-frequency scanning (inter-frequency scan thresholds) are indicated by double vertical lines within each cell such as the double vertical lines 706b-T1 and 706b-T2 shown in the cell 706b. As the UE travels from left to right within the serving cell 702a, it will eventually reach an inter-frequency scan threshold at a location proximate the double vertical line 702a-T2 requiring the UE to perform a scan for inter-frequency (vertical) neighboring cells.

This improved deployment 700 allows the UE to measure other common pilot signals operating on the same frequency as the serving cell frequency without having to transfer to another frequency. The operating distance/coverage for each cell is not changed. Only the pilot coverage has been increased. The separation between the PDSCH and PUSCH data channels of each cell is maintained to avoid any overlaps in co-channel. This means that data channel operation is unaffected or impacted by the improved deployment 700 shown in FIG. 7. Also, unlike the deployment 600 of FIG. 6, there are no holes or "breaks" between horizontal cells whereat there is no coverage for the broadcast channels on each frequency.

Therefore, unlike the deployment 600 of FIG. 6, using the improved deployment 700 of FIG. 7, at no point in time does the UE need to leave the serving frequency that it is operating on (the frequency that the serving BS/AP and serving cell operates) to obtain coverage from the MNO 708. This prevents the UE from transitioning to the MNO frequency looking for service when encountering holes in a frequency covered by other frequencies in the CBRS enterprise network 700.

As shown when comparing the inter-frequency scan thresholds within the cells of FIG. 6 with those of FIG. 7, the inter-frequency scan thresholds used in the deployment 700 of FIG. 7 can be less conservative than those used in the deployment 600 of FIG. 6. Additionally, due to the positioning of the horizontal and vertical cells shown in the improved deployment 700 of FIG. 7, for example, due to the positioning of cell 702a and its vertical neighbor cell 704a, transitions between inter-frequency (vertical) cells are assured to occur proximate the middle of the target vertical cell, thereby increasing the reliability of the transitions between vertical cells.

For example, assume that a selected UE moves from left to right in the cell 702a. When it reaches the location indicated by the double vertical lines 702a-T2, the UE performs inter-frequency scans for vertical neighbors. If the closest vertical neighbor is the cell 704a, due to the spatial deployment of the cells shown in the EN deployment 700, the UE will "land" in the center of the target cell 704a when it transitions from the serving cell 702a to the new serving cell 704a. This transitioning between cells is shown by the arrow 710. Note that the UE transitions to the vertical cell 704a proximate its center (as indicated by the single vertical line running from the top of the cell 704a to the bottom of the cell 704a). This also prevents the likelihood of the UE transitioning right back to the originally serving cell (e.g., cell 702a) and prevents the UE from bouncing or "ping-ponging" back and forth between two vertical cells.

The same type of strong transitioning between serving and target vertical cells occurs when the UE reaches the inter-frequency scan threshold 704a-T2 (of the cell 704a) and transitions (as shown by the arrow 712) from the new serving cell 704a to the next target vertical cell 706a. Again, advantageously, the UE transitions proximate the center of the target cell 706a as indicated by the single vertical line 706a-C running from the top of the cell 706a to the bottom of the cell 706a.

This improved deployment 700 of FIG. 7 permits the management of both idle mode and connected mode mobility of UEs. Extending the coverage provided by the broadcast channels (i.e., the CRS, PSS, SSS, and PBCH broadcast channels) while restricting the coverage provided by the data channels (i.e., the PDSCH and PUSCH data channels) allows for a less conservative inter-frequency scan threshold to be used and also prevents the UE from "bobbing", or "ping-ponging", back to the MNO 708.

When operating in idle mode, the UE manages its behavior and given the more relaxed scan threshold setting, the UE avoids inter-frequency scanning for cell reselection until absolutely necessary. When operating in connected mode, the UE is configured with horizontal neighbors for measurement and when the scanning threshold is reached, the inter-frequency scan measurement object is employed for immediate reporting. When the UE needs to transition frequencies for both idle and connected mode, it will put the UE in the middle (or center) of the vertical frequency neighbor cell avoiding ping-pong activities across the CBRS frequencies.

Another benefit provided by the deployment 700 of FIG. 7 is improved location determination of the UEs. Rather than having only one or two pilot signals available for trilateration techniques (for example), additional pilot signals are available to the UE and can be used to perform trilateration. Trilateration using the measurements obtained from horizontal neighbors can be performed using the BS/APs' GPS positions based on the signal strengths of the reported pilots. This can potentially be used for AGPS and E911 location support.

When an E911 call is occurring, inter-frequency measurements are not supported to prevent the call from being interrupted or dropped. The UE is not allowed to go missing from the channel and thereby potentially dropping the E911 call. The UE is not permitted to perform inter-frequency scans under these conditions. Under E911 conditions, there is no way to force the UE to make inter-frequency scanning measurements. Using the improved deployment 700 of FIG. 7, the UE has horizontal cell pilots available to it to perform better UE location determinations under these conditions. Consequently, the improved deployment 700 may potentially improve support for AGPS and E911 location determination during E911 calls.

Figure 8:
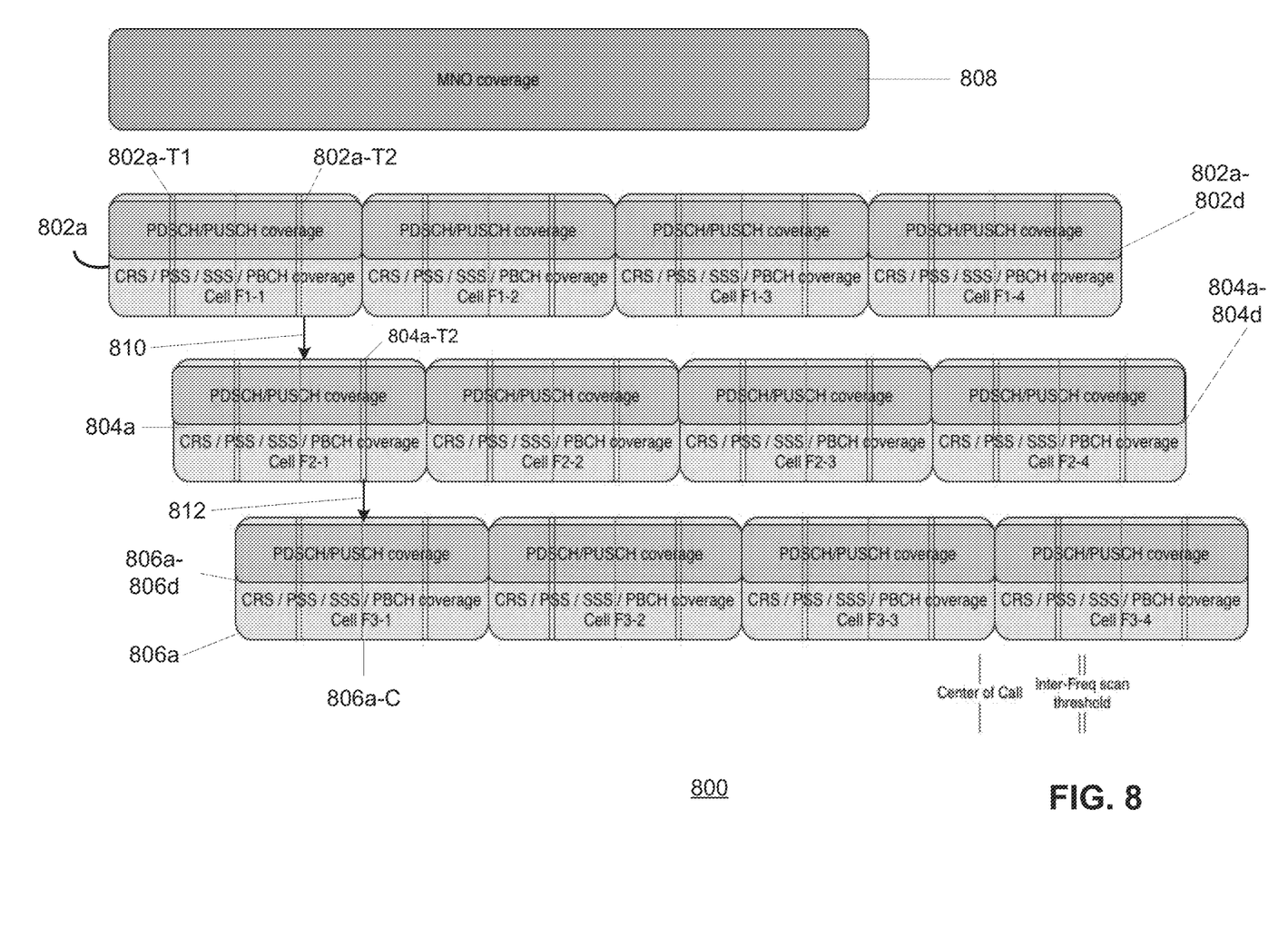
FIG. 8 is a block diagram showing another embodiment of an improved deployment of enterprise network BS/APs based on frequency reuse techniques wherein three frequencies are reused in the network in accordance with the present disclosure.

FIG. 8 is a block diagram showing another embodiment of an improved deployment 800 of enterprise network BS/APs based on frequency reuse techniques wherein three frequencies are reused in the network in accordance with the present disclosure. As shown in the improved deployment 800 of FIG. 8, and similar to the deployment 700 of FIG. 7, the intra-frequency (horizontal) cell coverages (such as the coverage provided by the cells 802a-802d) are abutted, or overlapped, as much as possible for a given operating frequency (such as, for example, for the frequency F1). Just as they are in the deployment 700 of FIG. 7, the power levels for the CRS/PSS/SSS pilot signals and the PBCH broadcast channels are expanded in each cell (such as in the cells 802a through 802d) such that the coverage provided by these signals abuts, or overlaps, horizontal neighbor cells (the coverage provided by the cell 802a abuts or overlaps that of the cell 802b, the coverage provided by the cell 802b abuts or overlaps that of the cell 802c, etc.).

In addition, and unlike the deployment 700 of FIG. 7, as shown in the deployment 800 of FIG. 8, the cell coverage provided by the PDSCH and PUSCH data channels are expanded such that the coverage provided by these signals abuts, or overlaps, horizontal neighbor cells (the cell 802a abuts or overlaps the cell 802b, the cell 802b abuts or overlaps the cell 802c, etc.). Notably, the power levels for the PDSCH and PUSCH data channels are established in each cell (such as, for example, in the cells 802a through 802d) such that the coverage provided by these signals abuts, or overlaps, horizontal neighbor cells. The deployment 800 and the coverage provided by the overlapping PDSCH and PUSCH data channels may, in some embodiments, require some type of co-channel interference cancellation techniques and possibly other co-channel interference reduction techniques to prevent or reduce co-channel interference due to the close proximity of the same frequency data channels. Such co-channel interference cancellation and reduction techniques are well known to those skilled in the wireless network communication arts and are not described further herein.

In some embodiments, although the data channels between cells in the deployment 800 of FIG. 8 are expanded such that the coverage provided by these signals abuts, or overlaps, horizontal neighbor cells, UEs are forced to transition to vertical neighbor cells before they can be impacted by any co-channel interference caused by the horizontal neighbor cell data transmissions. For example, as described above with regard to the deployment 700 of FIG. 7, assume that a selected UE is being served by a BS/AP in a serving cell 802a. As the UE moves from left to right within the serving cell 802a it will approach an inter-frequency scan threshold location indicated by the double vertical line 802a-T2, at which point it will perform an inter-frequency scan and transition to its vertical neighbor cell 804a (the transition is indicated in FIG. 8 by the arrow 810). This early transition between cells ensures that although the data channels abut or overlap between horizontal neighbor cells (e.g., between the cell 802a and the cell 802b), and that no "drops" in calls will therefore be allowed to occur, the data traffic between those horizontal neighbor cells do not create co-channel interference for the UE. The deployment 800 of FIG. 8 ensures that the UE's transition locations (such as the location 802a-T2) are sufficiently distant from the horizontal neighbor cell's data channels (such as for example, the horizontal neighbor cell 802b) to prevent the UE from experiencing co-channel interference on the data channels.

Similar to the improved deployment 700 of FIG. 7, using the improved deployment 800 of FIG. 8, at no point in time does the UE need to leave the serving frequency that it is operating on (the frequency that the serving BS/AP and serving cell operates) to obtain coverage from the MNO 808. This prevents the UE from transitioning to the MNO frequency looking for service when encountering holes in a frequency covered by other frequencies in the CBRS enterprise network 800. This is because there are no holes in the deployment 800 of FIG. 8.

As shown when comparing the inter-frequency scan thresholds within the cells of FIG. 6 with those of FIG. 8, the inter-frequency scan thresholds used in the deployment 800 of FIG. 8 can be less conservative than those used in the deployment 600 of FIG. 6. Additionally, due to the positioning of the horizontal and vertical cells shown in the improved deployment 800 of FIG. 8, for example, due to the positioning of cell 802a and its vertical neighbor cell 804a, transitions between inter-frequency (vertical) cells are assured to occur proximate the middle of the target vertical cell, thereby increasing the reliability of the transitions between vertical cells.

For example, assume that a selected UE moves from left to right in the cell 802a. When it reaches the location indicated by the double vertical lines 802a-T2, the UE performs inter-frequency scans for vertical neighbor cells. If the closest vertical neighbor cell is the cell 804a, due to the spatial deployment of the cells shown in the improved EN deployment 800, the UE will land in the center of the target cell 804a when it transitions from the serving cell 802a to the new serving cell 804a. When the inter-frequency threshold is reached, in connected mode operation the inter-frequency scan measurement object is employed for immediate report (120 ms.), and this is performed only once prior to the transition (or handover). This transitioning between cells is shown by the arrow 810. Note that the UE transitions to the vertical neighbor cell 804a proximate its center (as indicated by the single vertical line running from the top of the cell 804a to the bottom of the cell 804a). This also prevents the likelihood of the UE transitioning right back to the original serving cell (e.g., the original serving cell 802a) and prevents the UE from bouncing or "ping-ponging" back and forth between the two vertical neighbor cells.

The same type of strong transitioning between serving and target vertical neighbor cells occurs when the UE reaches the inter-frequency scan threshold 804a-T2 (of the cell 804a) and transitions (as shown by the arrow 812) from the new serving cell 804a to the next target vertical cell 806a. Again, advantageously, the UE transitions proximate the center of the target cell 806a as indicated by the single vertical line 806a-C running from the top of the cell 806a to the bottom of the cell 806a.

This improved deployment 800 of FIG. 8 permits the management of both idle mode and connected mode mobility of UEs. Expanding the coverage provided by the broadcast channels (i.e., the CRS, PSS, SSS, and PBCH broadcast channels) while also expanding the coverage provided by the data channels (i.e., the PDSCH and PUSCH data channels) allows for a less conservative inter-frequency scan threshold to be used and also prevents the UE from "bobbing", or "ping-ponging", back to the MNO 808.

As with the deployment 700 of FIG. 7, when operating in idle mode in the deployment 800 of FIG. 8, the UE manages its behavior and, given the more relaxed inter-frequency scan threshold setting, the UE avoids inter-frequency scanning for cell reselection until absolutely necessary. When operating in connected mode, the UE is configured with horizontal neighbors for measurement and when the scanning threshold is reached, the inter-frequency scan measurement object is employed for immediate reporting. When the UE needs to transition frequencies for both idle and connected mode, it will put the UE in the middle (or center) of the vertical frequency neighbor cell avoiding ping-pong activities across the CBRS frequencies.

Similar to the improved deployment 700 of FIG. 7, another benefit provided by the improved deployment 800 of FIG. 8 is improved location determination of the UEs, especially during E911 calls. Rather than having only one or two pilot signals available for trilateration techniques (for example), additional pilot signals can be used to perform trilateration. Trilateration using the measurements obtained from horizontal neighbors can be performed using the BS/APs' GPS positions based on the signal strengths of the reported pilots. This can potentially be used for AGPS and E911 location support.

Using the improved deployment 800 of FIG. 8, the UE has horizontal cell pilots available to it to perform better under these conditions. Consequently, the improved deployment 800 may potentially improve support for AGPS and E911 location determination (for the reasons set forth in more detail above describing the improved deployment 700 of FIG. 7).

Using the improved EN deployments 700 and 800 of FIG. 7 and FIG. 8, respectfully, battery consumption issues related to the UEs are improved. Inter-frequency scans are performed less frequently than when using the older EN deployment 600 of FIG. 6. The improved EN deployments 700, 800 also increase the reliability of mobility within an EN campus whereon the improved EN deployments are used. Also, the improved EN deployments 700, 800 address redundancy of BS/AP (also referred to as eNB) deployments thereby avoiding service outages in specific areas due to a single BS/AP failure occurring within the EN. Owing to the spatial deployment of BS/APs in the improved deployments 700 and 800, UEs have sufficiently close BS/APs (and associated cell coverages) available to them even if their serving BS/AP (and associated serving cell) fails to operate due to some malfunction. The redundancy of cell coverage provided by the improved deployments 700, 800 provides redundancy of BS/APs and allows the UEs to continue operation even if a single BS/AP fails.

CONCLUSION

By providing dynamic adjustment of measurement thresholds for connected and idle modes, the presently disclosed method and apparatus more efficiently and effectively manages load balancing in an enterprise network. It should be noted that these techniques may also be applicable to other communication networks as well.

Furthermore, by optimally employing periodic and event driven measurement reports based on the constitution of the device types, supported traffic types and expected congestion in the network, power and thus battery life in the UEs can be used most efficiently.

In some embodiments in which the UE only performs intra-frequency (horizontal) measurements and alternatively only performs inter-frequency (vertical) measurements when needed further supports a deployment configuration that will allow for such measurement types to result in better battery performance in UEs within the network. Additionally, deployment methodologies may be used that enable triggers for intra-frequency scans prior to enabling triggers for inter-frequency scans.

In addition, by reacting to load information that is current, that represents a time-series, and that is predicted, provides an effective way to determine when to use the load balancing strategies outlined in this disclosure.

By using dynamic adjustment of handover transition points based on reported measurements, the disclosed method and apparatus provides a flexible and efficient means for determining when to move UEs from one cell to another to balance the loads between various cells of the enterprise network.

Performing load balancing actions only when required, e.g., only when the congestion level is above a certain threshold on a given eNB, ensures that load balancing is done efficiently and without unnecessary handoffs.

Supporting a closed-loop function helps preventing the algorithm from not converging resulting in repeated transitioning of UEs across BS/APs (eNBs).

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of load balancing a plurality of BS/APs in a wireless network, comprising:
    a) receiving information regarding the load of each of the plurality of BS/APs;
    b) receiving a plurality of UE measurements from a plurality of UEs, wherein the UE measurements comprise signal strengths of signals received by the plurality of UEs from the BS/APs in the wireless network;
    c). reporting load conditions of each of the BS/APs to a load balancer (LBr) based on the received information regarding the load of the plurality of BS/APs;
    d) determining an inter-frequency search threshold responsive to reported load information and the received UE measurements;
    e) when the signals received by at least one the plurality of UEs from the serving BS/APs currently serving the at least one UE falls below the determined search threshold, the serving BS/AP that is currently serving the at least one UE configures the UE to search for inter-frequency neighbors and report on the signals received from those inter-frequency neighbors;
    f). determining a Handover (HO) configuration responsive to the received UE measurements and the load condition of the BS/APs, the HO configuration to be used by each BS/AP to determine hand-out of the plurality of UEs from the respective serving BS/AP, wherein hand-out of a selected UE comprises releasing the selected UE from the serving BS/AP and to determine the hand-in from each BS/AP, wherein the hand-in comprises accepting a UE into service.

2. The method of load balancing of BS/APs in a wireless network of claim 1, wherein the load conditions of each BS/AP that is reported to the LBr includes at least one of the following pieces of information:
    a) a number of active UEs being serviced by the BS/AP;
    b) a number of UEs that are camped on the BS/AP;

c) a total number of flows associated with all active UEs;

d) an average packet error rate for all UEs communicating through the BS/AP; and e) reference signal received quality (RSRQ) as determined from the UEs.

3. The method of load balancing of BS/APs in a wireless network of claim 1, wherein each BS/AP is limited due to limitations imposed by limited hardware, radio resources, CPU and memory resources, and wherein such imposed limitations dictate the maximum number of UEs that each BS/AP can serve.

4. The method of load balancing of BS/APs in a wireless network of claim 3, wherein such imposed limitations further dictate the maximum number of flows that the BS/AP can serve.

5. The method of load balancing of BS/APs in a wireless network of claim 3, wherein a selected UE is denied service when it tries to connect to a BS/AP that lacks sufficient resources to adequately accommodate the selected UE.

6. The method of load balancing of BS/APs in a wireless network of claim 1, wherein the received information regarding the load is based on a determination of how many UEs are being serviced by the serving BS/AP.

7. The method of load balancing of BS/APs in a wireless network of claim 1, wherein the received information regarding the load comprises information regarding the loading of a serving BS/AP based on the amount of data flowing through a serving BS/AP from all UEs that the serving BS/AP is servicing.

8. The method of load balancing of BS/APs in a wireless network of claim 1, wherein the predetermined search threshold comprises reference signal received power (RSRP) thresholds of connected mode UEs at which the serving BS/AP serving the connected mode UEs configures the connected mode UEs to search for inter-frequency neighbors.

9. The method of load balancing of BS/APs in a wireless network of claim 1, wherein a reference signal received quality (RSRQ) threshold is used as the predetermined search threshold.

10. The method of load balancing of BS/APs in a wireless network of claim 9, wherein the RSRP measurement threshold is used to trigger an HO event for neighbor and source BS/APs.

* * * * *